United States Patent
Burbank

(10) Patent No.: US 6,226,860 B1
(45) Date of Patent: May 8, 2001

(54) METHOD OF FORMING AN INDUCTIVE WRITER HAVING A HIGH CONDUCTOR/INSULATOR RATIO

(75) Inventor: Daniel Paul Burbank, Minneapolis, MN (US)

(73) Assignee: Seagate Technology, Inc., Scotts Valley, CA (US)

( * ) Notice: Subject to any disclaimer, the term of this patent is extended or adjusted under 35 U.S.C. 154(b) by 0 days.

(21) Appl. No.: 09/119,085

(22) Filed: Jul. 20, 1998

Related U.S. Application Data

(60) Provisional application No. 60/053,431, filed on Jul. 22, 1997.

(51) Int. Cl.$^7$ ...................................................... G11B 5/42
(52) U.S. Cl. .................. 29/603.14; 29/602.1; 29/603.24; 29/603.25
(58) Field of Search ........................... 29/603.24, 603.25, 29/602.1, 603.14; 360/123, 124; 336/200

(56) References Cited

U.S. PATENT DOCUMENTS

| | | |
|---|---|---|
| 4,416,056 * | 11/1983 | Takehashi ..................... 29/603.25 X |
| 4,803,580 | 2/1989 | Mowry . |
| 4,891,725 | 1/1990 | Mowry . |
| 5,130,877 | 7/1992 | Hsie et al. . |
| 5,155,646 | 10/1992 | Fujisawa et al. . |
| 5,274,520 | 12/1993 | Matsuzono et al. . |
| 5,621,596 | 4/1997 | Santini . |
| 5,673,474 * | 10/1997 | Watterston et al. ........... 29/603.24 X |

* cited by examiner

Primary Examiner—Carl E. Hall
(74) Attorney, Agent, or Firm—Kinney & Lange, P.A.

(57) ABSTRACT

A method of fabricating a coil structure for use in a writer portion of a recording head is disclosed. The method comprises fabricating a bottom pole. A bottom insulating layer is fabricated on the bottom pole, while a seed layer is fabricated on the bottom insulator layer. Alternating third and fourth coil conductors are spacially positioned on the seed layer. A first plurality of insulating barriers are fabricated on the seed layer between the alternating third and fourth coil conductors. A middle insulating layer is fabricated on the third coil conductor, the second coil conductor, and the first plurality of insulating barriers. The A alternating third and fourth coil conductors are spacially positioned on the middle insulating layer. A second plurality of insulating barriers are fabricated on the middle insulating layer between the alternating third and fourth conductors. A top insulating layer is fabricated on the third conductor coil, fourth conductor coil, and the second plurality of insulating barriers. A top pole is fabricated on the top insulating layer.

20 Claims, 6 Drawing Sheets

METHOD OF FORMING AN INDUCTIVE WRITER HAVING A HIGH CONDUCTOR/INSULATOR RATIO

This application is based upon and claims priority from U.S. Provisional Application No. 60/053,431, filed Jul. 22, 1997.

BACKGROUND OF THE INVENTION

This application relates to a magnetic read/write recording head used in disc drive applications. Specifically, the present invention relates to a method of fabricating a coil structure for use in a writer portion of a magnetic read/write recording head.

Standard recording heads are fabricated with a writer portion fabricated on top of a reader portion. Recording heads are used in magnetic storage systems to detect magnetically encoded information from a magnetic storage medium or disc and to write magnetically encoded information to the storage medium.

Presently there are two types of recording heads used in a disc drive of a computer device. First there is an inductive magnetic recording head which incorporates an inductive writer portion and an inductive reader portion. Second, there is a magnetoresistive recording head which incorporates an inductive writer portion and a magnetoresistive reader portion. Thus, regardless of the type of reader portion which is utilized in the recording head, the writer portion is an inductive writer portion.

A typical inductive writer of a recording head consists of one or more coil conductor layers protected by insulating layers and surrounded by an upper and a lower magnetic core (also called top and bottom poles or called top and shared poles) which are separated at the air bearing surface of the writer by a thin magnetic gap layer. The air bearing surface is the surface of the recording head immediately adjacent to the magnetic medium or disc. Fabrication of the coil layers typically involves planarizing the surface on which the coils will be positioned with either a photoresist process or a metallic layer and photoresist combination process. Individual coils are then positioned on the planarized surface and encapsulated with another photoresist layer to insulate and electrically isolate the coils as well as protect the coils from damage during subsequent processing steps.

Prior art recording devices typically include three or four coil layers. As coils are typically stacked several layers high, most insulating photoresist layers provide insulation and isolation of a coil layer and provide a planarized top surface by which a succeeding coil layer in the stack can be fabricated. Coil layers will typically form stepped surfaces in which the next coil layer is either larger than the previous coil layer, when the coil layers are formed upon a recessed bottom pole, or is smaller than the preceding layer when the coil layers are formed on a planarized bottom pole or extend above the recess portion of the bottom pole.

Fabrication of a writer portion of a magnetic read/write recording head is dictated by the physical fabrications limitations of the coils using conventional thin-filmed head process use.

In standard prior art applications, the magnetic coils are separated from one another on the same level by an insulating barrier which is approximately equal in width to the width of the magnetic coil. Likewise, the magnetic coils of adjacent layers are separated by an insulating layer approximately equal in height to the height of the inductive coil. Thus, a typical coil structure has a conductor/insulator cross-sectional area ratio of 40 percent.

There is a need for improving the conductor/insulator cross-sectional area ratio of a writer portion of a magnetic read/write recording head. In particular, there is need for a writer portion of a magnetic read/write recording head which will have a higher packing density of magnetic coils within a given area. A writer portion of this nature would produce a more efficient magnetic writer.

BRIEF SUMMARY OF THE INVENTION

The present invention is a method of fabricating a coil structure for use in a writer portion of a recording head. The method comprises forming an inductive writer which maximizes the conductor/insulator ratio thereby providing a greater packing density of conductor coils in a minimum amount of space. The distance between conducting coils on a given layer is minimized, while the insulator necessary between adjacent layers is also minimized. Therefore, a more accurate inductive writer is fabricated through a minimum amount of processing steps.

The method comprises fabricating a bottom insulating layer on a bottom pole. A seed layer is fabricated on the bottom insulator. Alternating first and second coil conductors are spatially positioned on the seed layer. A first plurality of insulating barriers are fabricated on the seed layer between the alternating first and second coil conductors. A middle insulating layer is fabricated on the first coil conductor, the second coil conductor, and the first plurality of insulating barriers. Alternating third and fourth coil conductors are spatially positioned on the middle insulating layer. A second plurality of insulating barriers are fabricated on the middle insulating layer between the alternating third and fourth conductors. A top insulating layer is fabricated on the third conductor coil, fourth conductor coil, and second plurality of insulating barriers. A top pole is fabricated on top of the top insulating layer to complete the fabrication process.

DETAILED DESCRIPTION

Figure 1:
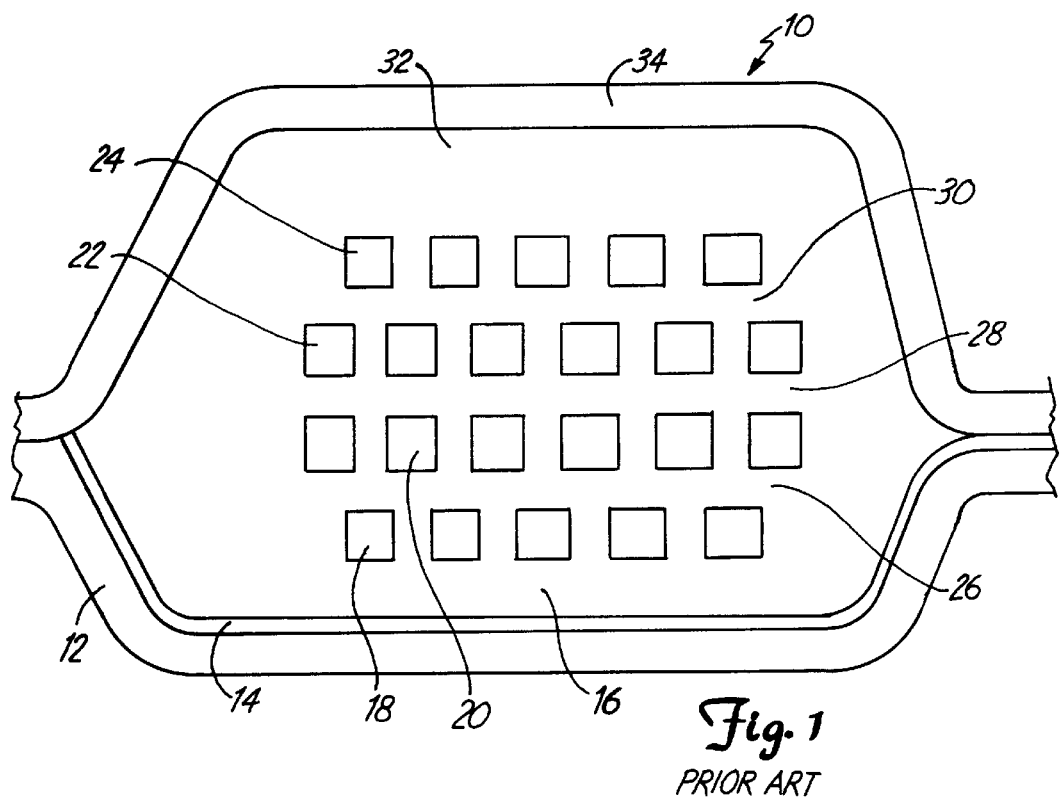
FIG. 1 is a prior art inductive writer having a recessed region of a bottom pole.

FIG. 1 shows a typical prior art inductive writer portion of a magnetic recording head. Prior art inductive writer 10 is used in conjunction with either an inductive reader or a magnetoresistive reader. As shown in FIG. 1, inductive writer 10 includes bottom pole 12, gap oxide 14, bottom insulating layer 16, coil conductor layers 18, 20, 22, and 24, intermediate insulating layers 26, 28, and 30, top insulating layer 32, and top pole 34.

As shown in FIG. 1, inductive writer 10 has four coil conductor layers 18, 20, 22, and 24. However, it is understood by those in the art that the number of layers of conductive coils can vary depending upon the particular application. However, it has become standard in the industry to have at least four coil conductor layers.

Fabricating prior art inductive writer 10 includes a variety of steps. First, resist bottom pole 12 is fabricated. Gap oxide layer 14 is then fabricated on top of resist bottom pole 12. The top of gap oxide layer 14 is then planarized. Bottom insulating layer 16 is then fabricated on top of gap oxide layer 14. The top surface of bottom insulating layer 16 is then planarized using either a photoresist or a metallic layer and photoresist combination. A seed layer (not shown in FIG. 1) is then deposited on the planarized surface of bottom insulating layer 16. Coil conductor layer 18 is then plated on the seed layer, after which the coil conductors are encapsulated with another reflow photoresist layer, which forms intermediate insulating layer 26, to insulate and electrically isolate the coils as well as protect the coils from damage during subsequent processing steps. The top surface of intermediate insulating layer 26 will be planarized for the formation of succeeding coil conductor layer 20. This process is repeated for each coil conductor layer. Finally, top pole 34 is fabricated on top of top insulating layer 32 to complete the fabrication of inductive writer 10.

The width and height of each coil conductor of coil conductor layers 18, 20, 22, and 24 are approximately 2.0 microns by 2.0 microns. The distance between coil conductors on a given layer is approximately 1.0 to 1.5 microns, while the distance between coil conductors on adjacent layers is approximately 1.0 to 2.0 microns.

Prior art coil conductors layers are formed layer by layer from bottom to top incorporating a single coil. Coil conductor layers will typically form stepped surfaces in which the next coil layer is either larger than the prior coil layer, when layers are formed upon a recessed bottom pole, such as shown in FIG. 1, or are smaller than the preceding layer, as in the case when coil layers are formed on a planar bottom pole or extend above the resist portion of the recessed bottom pole.

Magnetic read/write recording heads used in disc drive applications are limited in performance by the electrical resistance of the coil conductors that can be fabricated using conventional thin film head processes. A typical coil structure, such as that shown in FIG. 1, has a conductor/insulator cross sectional area ratio of 40%. Increasing this ratio, which is achieved by the present invention, without altering other form factors, reduces the electrical resistance proportionally, permitting higher current, and consequently higher ampere-turns, for a given power dissipation in the coil. Alternatively, the packing density improvement of the present invention permits the same current through the coil with a form factor greatly reduced. This allows the same ampere-turns in a smaller, lower inductance structure, and thus improves the high frequency performance of the head.

Figure 2:
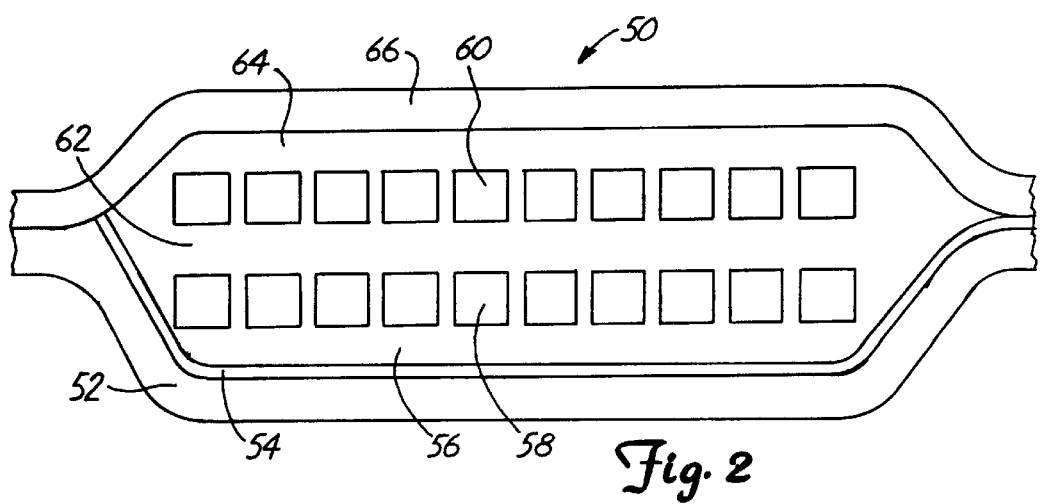
FIG. 2 is an inductive writer having a recessed region of a bottom pole incorporating the present invention.

FIG. 2 is an inductive writer having a recessed region of a bottom pole incorporating the present invention. Inductive writer 50 include the bottom pole 52, gap oxide 54, bottom insulating layer 56, coil conductor layers 58 and 60, intermediate insulating layer 62, top insulating layer 64, and top pole 66.

The width and the height of each coil conductor of coil conductor layers 58 and 60 are approximately 2.0 microns by 2.0 microns. These dimensions are similar to that of prior art inductive writer 10. However, the distance between coil conductors on a given layer is in the range of 0.25 and 1.0 microns, and the distance between coil conductors on adjacent layers is in the range of 0.25 and 1.0 microns.

The distance between coil conductors, either on the same level or on adjacent levels, is a function of the insulating barriers between the coil conductors. The insulating barriers must be sufficiently wide enough to stand off any voltages from an adjacent coil conductor. Prior art writers, such as writer 10 shown in FIG. 1, had much wider insulating barriers due to processing limitations.

Fabricating inductive writer 50 include the variety of steps. These steps will be further discussed with reference to FIGS. 3–6.

Figure 3:
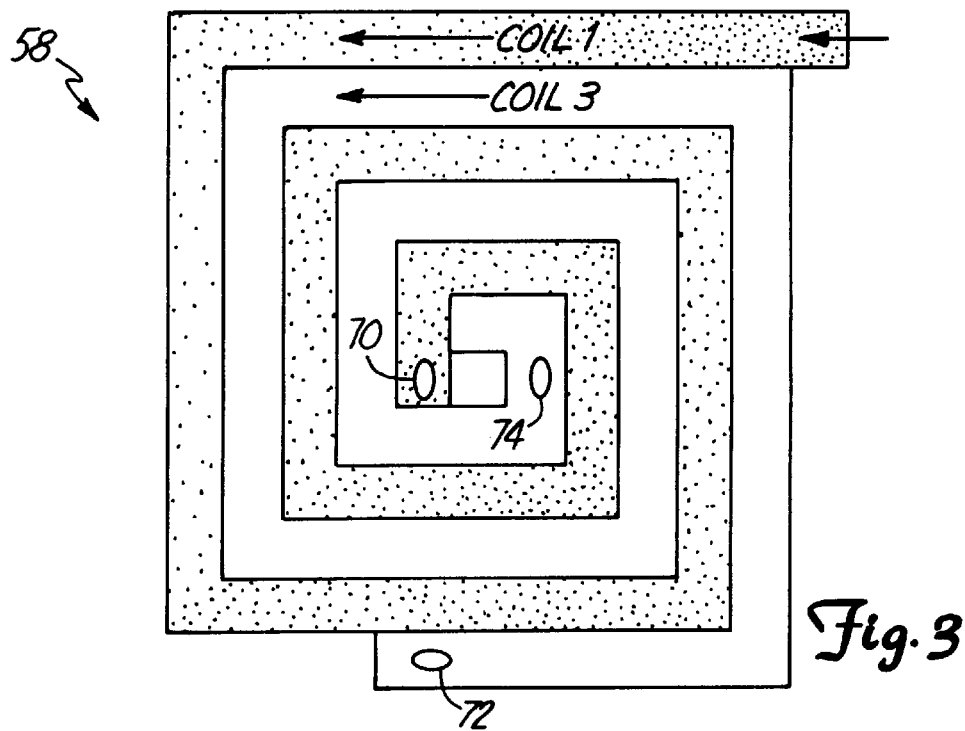
FIG. 3 is a top view showing the coil structure for the first layer of conductive coils of FIG. 2.
Figure 4:
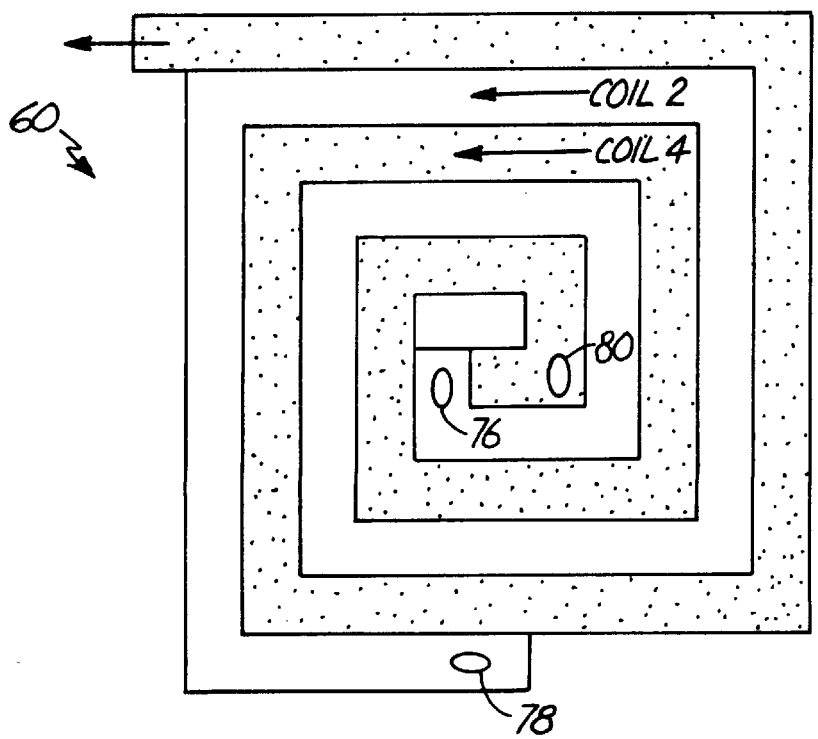
FIG. 4 is a top view showing the coil structure for the second layer of conductive coils of FIG. 2.

FIGS. 3 and 4 are top views showing the coil structure for the first and second layer of conductive coils of FIG. 2, respectively. Coil conductor layer 58, shown in FIG. 3, includes coil 1 and coil 3, which are alternating coils, as well as vias or interlevel connecting points 70, 72, and 74. Similarly, FIG. 4 shows coil conductor layer 60 having coil 2 and coil 4, which are alternating coils, as well as vias or interlevel connecting points 76, 78, and 80.

Coils 1, 2, 3, and 4 are actually a single coil, but have been labeled in sections for clarity. It must also be noted that the direction of current flow in the coils (clockwise or counterclockwise) is irrelevant, as long as the current flows in the same direction in all coils. The coil begins at external circuitry and enters FIG. 3 at Arrow A of Coil 1. Coil 1 is wound continuously tighter circles until it reaches via 70, which is the via to coil 2 of FIG. 4. Coil 2 begins at via 76 and is wound in a circular motion outwardly until via 78. Via 78 is the via to coil 3 of FIG. 3. Coil 3 begins at via 72 and is wound until via 74 is reached. Via 74 is the via between coils 3 and 4. Coil 4 begins at via 80 and is wound until arrow B, which designates that the coil goes to external circuitry. Vias 70–80 are formed during the process steps which form Coils 1–4.

FIGS. 3 and 4 show a coil structure of a single coil which can be divided into several coil sections, such as coil sections 1–4, creating a two layer coil structure used in the present invention. The coil structure of the present invention has only two layers, is formed in a zig-zag manner between the two layers, and minimizes the insulation necessary between coils and between coil layers.

FIGS. 5A–5K are sectional views of a single coil layer structure showing a method for fabricating the coil structure used in the present invention. The method of fabricating the coil layer structure described below discusses forming a single coil layer structure, such as that of coil conductor layer 58 or 60 shown in FIG. 2. However, it is understood that while only one coil layer structure is described below, additional coil layer structures would be fabricated using the same method.

As shown in FIGS. 5A–5K, the method of fabricating the coil layer structure begins with vacuum depositing seed layer 102 on top of insulating layer 100. Pattern coils 104 are then fabricated using coat photoresist and a pattern lithography process. Enhanced seed layer 106 is then plated to enhance the thickness of the exposed seed layer between pattern coils 104. Pattern coils 104 are then isotropically eroded using a plasma etching process. The top portion of seed layer 102 and enhanced seed layer 106 is removed by any one of a multiple of processes such as ion milling, sputtering, or selective wet chemical etch.

Figure 5A:
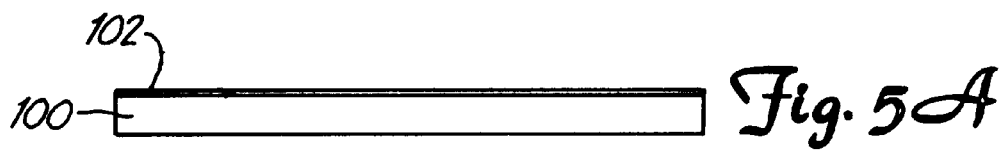
FIGS. 5A–5K are sectional views of a single coil layer structure showing a method for fabricating the coil structure used in the present invention.
Figure 5B:
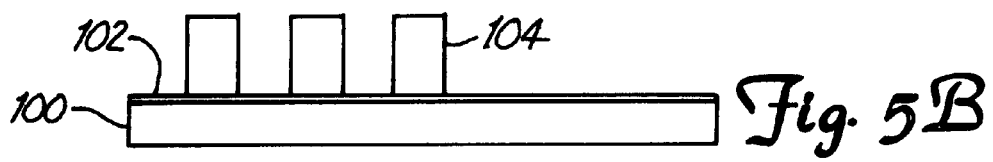
Figure 5C:
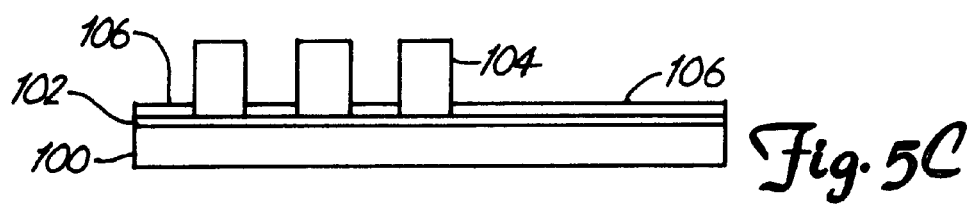
Figure 5D:
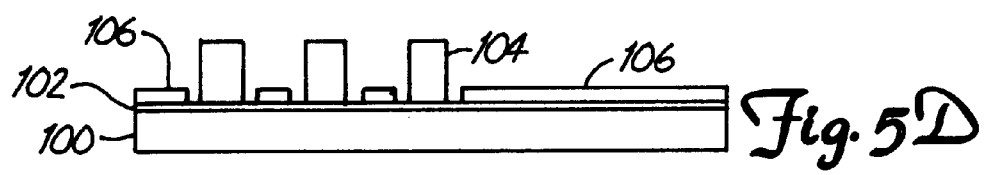
Figure 5E:
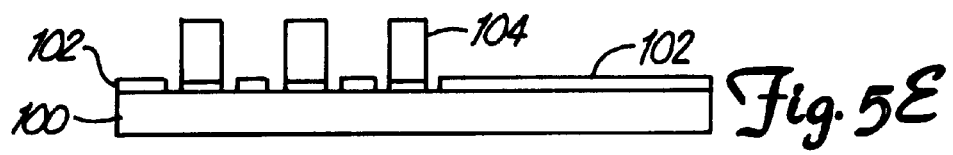
Figure 5F:
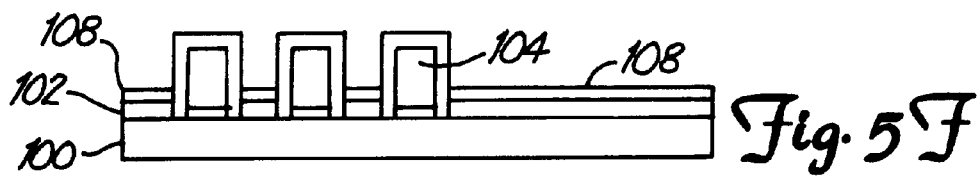
Figure 5G:
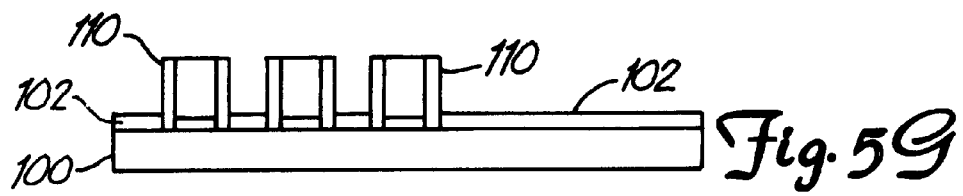
Figure 5H:
Figure 5I:
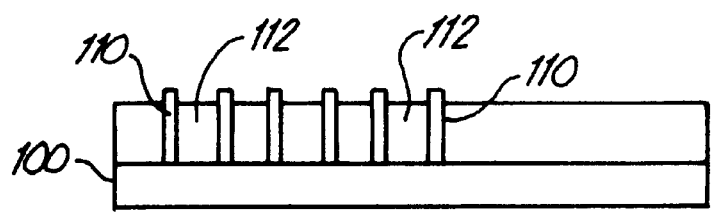
Figure 5J:
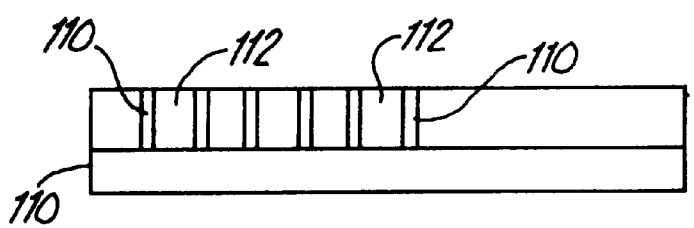
Figure 5K:
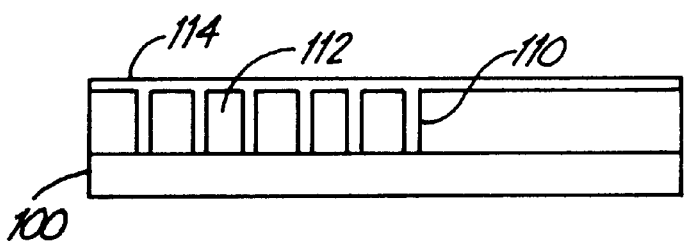

Conformal mask deposition 108 is fabricated on top of insulating layer 100, seed layer 102, and pattern coils 104 through a low temperature isotropic deposition, such as through the use of sputtered oxide. The top layer of conformal mask deposition 108 is then anisotropically etched back through use of a reactive ion etch or a reactive ion milling process. Pattern coils 104 are then removed through use of a strip resist such as a plasma etch or a wet chemical removal process, thereby leaving only insulating barriers 110. Conductor coils are then electroplated between insulating barriers 110. As shown in FIG. 5I, insulating barriers 110 extend higher than conducting coils 112. The top layer of insulating barriers 110 are then planarized using a lapping or chemical mechanical polish process. Finally, insulating layer 114 is deposited through use of a sputtered deposition.

As discussed earlier, for additional layers, the above process may be repeated as necessary.

FIGS. 6A–6L show an alternate embodiment of fabricating a plurality of conducting coils separated by a thin insulating barrier. The method shown and described with reference to FIGS. 6A–6L begin with several of the same steps as previously described with respect to FIGS. 5A–5K. In particular, the first six steps corresponding to FIGS. 6A–6G are identical to those shown and described with respect to FIGS. 5A–5G. Thus, this discussion will not be repeated.

Figure 6A:
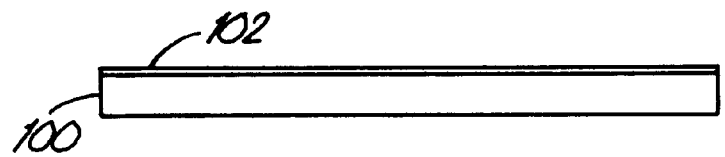
FIGS. 6A–6L are sectional views showing an alternate method for fabricating the coil structure of the present invention.
Figure 6B:
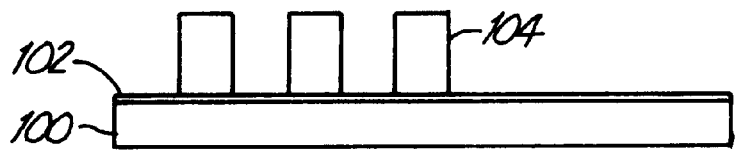
Figure 6C:
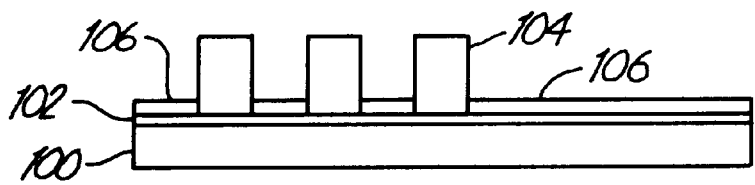
Figure 6D:
Figure 6E:
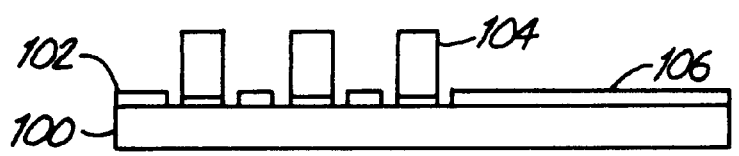
Figure 6F:
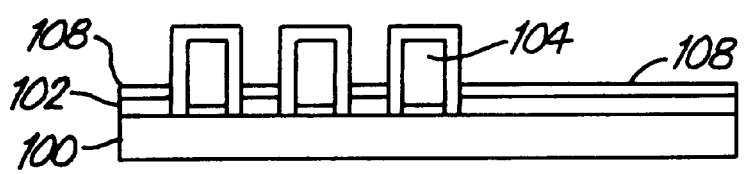
Figure 6G:
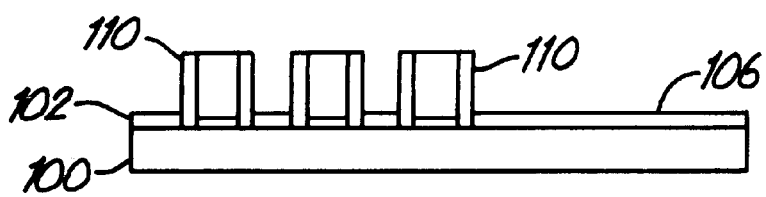
Figure 6H:
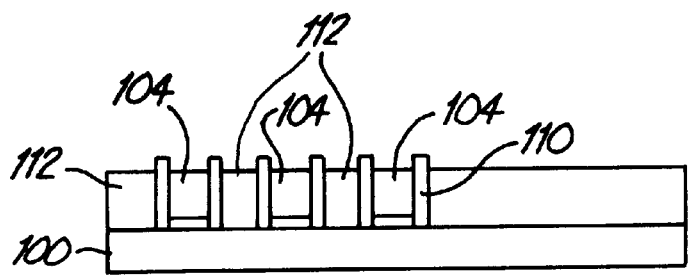
Figure 6I:
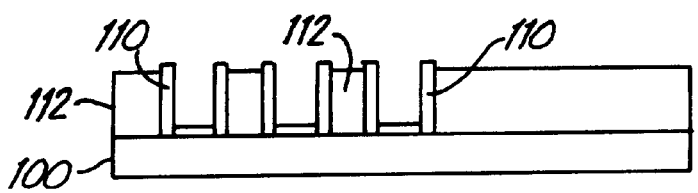
Figure 6J:
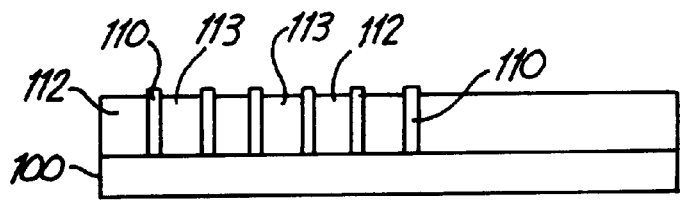
Figure 6K:
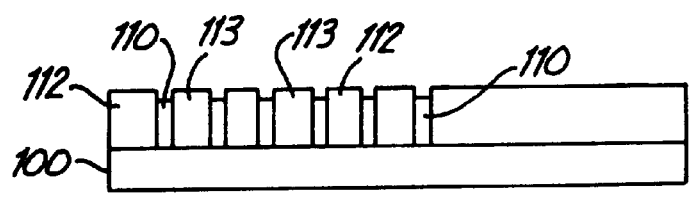
Figure 6L:
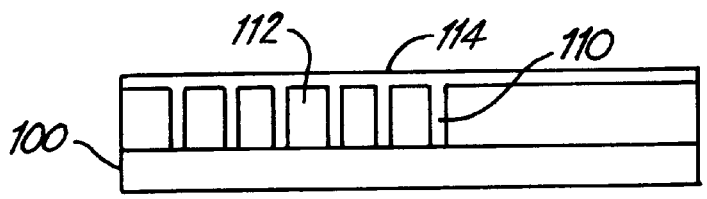

As shown in FIG. 6H, first coil 112 is first electroplated, while pattern coils 104 remain in place. Pattern coils 104 are then removed via a strip resist process such as a plasma etch or a wet chemical removal process. Second coil 113 is then plated via an electroplating process. Insulating barriers 110 are then planarized using a chemical mechanical polish or selective etch. Finally, insulating layer 114 is sputter deposited on top of first coil 112, second coil 113, and insulating barriers 110.

The above process may be repeated for additional layers as necessary.

The present invention, as shown and described with respect to FIGS. 2–6 is a process for fabricating an inductive writer which maximizes the conductor/insulator ratio. Through use of the fabrication process as shown and described above, an inductive writer can be fabricated which provides the maximum number of conductive coils in a given area separated by a minimum amount of insulation. Thus, the present structure provides an improvement in packing density of the conductor coils.

Although the present invention has been described with reference to preferred embodiments, workers skilled in the art will recognize that changes may be made in form and detail without departing from the spirit and scope of the invention.

What is claimed is:

1. A method of fabricating a coil structure for use in a writer portion of a recording head, the method comprising:
   fabricating a first seed layer on a bottom insulating layer;
   fabricating a first plurality of insulating barriers spatially positioned on the first seed layer, wherein the step of fabricating a first plurality of insulating barriers further comprises:
      fabricating a first pattern coil on the first seed layer, the first pattern coil leaving an exposed first seed layer not covered by the first pattern coil;
      enhancing a thickness of the exposed first seed layer;
      isotropically eroding the first pattern coil;
      removing the enhanced thickness of the exposed first seed layer;
      fabricating a mask deposition;
      removing a portion of the mask deposition positioned above the first pattern coil and the exposed first seed layer;
      stripping the first pattern coil, thereby exposing the first plurality of insulating barriers; and
   fabricating a first coil conductor and a second coil conductor between the first plurality of insulating barriers such that the first coil conductor and the second coil conductor are alternately positioned between the plurality of first insulating barriers.

2. The method of claim 1 wherein the step of fabricating a first plurality of insulating barriers further comprises:
   fabricating a first plurality of insulating barriers on the first seed layer, each insulating barrier having a width of less than 1.0 microns.

3. The method of claim 1 and further comprising:
   fabricating a middle insulating layer on the first coil conductor, the second coil conductor, and the first plurality of insulating barriers;
   fabricating a second plurality of insulating barriers spatially positioned on the middle insulating layer;
   fabricating a third coil conductor and a fourth coil conductor between the second plurality of insulating barriers such that the third coil conductor and the fourth coil conductor are alternately positioned between the plurality of second insulating barriers; and
   fabricating a top insulating layer on the third coil conductor, the fourth coil conductor, and the second plurality of insulating barriers.

4. The method of claim 3 wherein the step of fabricating a second plurality of insulating barriers further comprises:
   fabricating a second plurality of insulating barriers on the middle insulating layer, each insulating barrier having a width of less than 1.0 microns.

5. The method of claim 3 wherein the step of fabricating a middle insulating layer further comprises:
   fabricating a middle insulating layer having a thickness of less than 1.0 microns.

6. The method of claim 1 wherein the step of fabricating a first coil conductor and a second coil conductor between the first plurality of insulating barriers further comprises:
   fabricating the first coil conductor;
   fabricating the second coil conductor; and
   planarizing the first plurality of insulating barriers, the first coil conductor and the second coil conductor.

7. The method of claim 3 wherein the step of fabricating a second plurality of insulating barriers further comprises:
   fabricating a second seed layer on the middle insulating layer;
   fabricating a second pattern coil on the second seed layer, the second pattern coil leaving an exposed second seed layer not covered by the second pattern coil;
   enhancing a thickness of the exposed second seed layer;
   isotropically eroding the second pattern coil;
   removing the enhanced thickness of the exposed second seed layer;
   fabricating a mask deposition;
   removing a portion of the mask deposition positioned above the second pattern coil and the exposed second seed layer; and
   stripping the second pattern coil, thereby exposing the second plurality of insulating barriers.

8. The method of claim 7 wherein the step of fabricating a third coil conductor and a fourth coil conductor between the second plurality of insulating barriers further comprises:
   fabricating the third coil conductor;
   fabricating the fourth coil conductor; and
   planarizing the second plurality of insulating barriers, the third coil conductor and the fourth coil conductor.

9. The method of claim 3 wherein the step of fabricating a second plurality of insulating barriers further comprises:
   fabricating a second seed layer on the middle insulating layer;

fabricating a second pattern coil on the second seed layer, the second pattern coil leaving an exposed second seed layer not covered by the second pattern coil;

enhancing a thickness of the exposed second seed layer;

isotropically eroding the second pattern coil;

removing the enhanced thickness of the exposed second seed layer;

fabricating a mask deposition; and removing a portion of the mask deposition positioned above the second pattern coil and the exposed second seed layer.

10. The method of claim 9 wherein the step of fabricating a third coil conductor and a fourth coil conductor between the second plurality of insulating barriers further comprises:

fabricating the third coil conductor;

stripping the second pattern coil;

fabricating the fourth coil conductor; and planarizing the second plurality of insulating barriers, the third coil conductor and the fourth coil conductor.

11. A method of fabricating a coil structure for use in a writer portion of a recording head, the method comprising:

fabricating a first seed layer on a bottom insulating layer;

fabricating a first plurality of insulating barriers spatially positioned on the first seed layer, wherein the step of fabricating a first plurality of insulating barriers further comprises:

fabricating a first pattern coil on the first seed layer, the first pattern coil leaving an exposed first seed layer not covered by the first pattern coil;

enhancing a thickness of the exposed first seed layer;

isotropically eroding the first pattern coil;

removing the enhanced thickness of the exposed first seed layer;

fabricating a mask deposition;

removing a portion of the mask deposition positioned above the first pattern coil and the exposed first seed layer;

fabricating a first coil conductor and a second coil conductor between the first plurality of insulating barriers such that the first coil conductor and the second coil conductor are alternately positioned between the plurality of first insulating barriers.

12. The method of claim 11 and further comprising:

fabricating a middle insulating layer on the first coil conductor, the second coil conductor, and the first plurality of insulating barriers;

fabricating a second plurality of insulating barriers spatially positioned on the middle insulating layer;

fabricating a third coil conductor and a fourth coil conductor between the second plurality of insulating barriers such that the third coil conductor and the fourth coil conductor are alternately positioned between the plurality of second insulating barriers;

fabricating a top insulating layer on the third coil conductor, the fourth coil conductor, and the second plurality of insulating barriers; and fabricating a top pole on the top insulating layer.

13. The method of claim 11 wherein the step of fabricating a first plurality of insulating barriers further comprises:

fabricating a first plurality of insulating barriers on the first seed layer, each insulating barrier having a width of less than 1.0 microns.

14. The method of claim 12 wherein the step of fabricating a second plurality of insulating barriers further comprises:

fabricating a second plurality of insulating barriers on the second seed layer, each insulating barrier having a width of less than 1.0 microns.

15. The method of claim 12 wherein the step of fabricating a middle insulating layer further comprises:

fabricating a middle insulating layer having a thickness of less than 1.0 microns.

16. The method of claim 11 wherein the step of fabricating a first coil conductor and a second coil conductor between the first plurality of insulating barriers further comprises:

fabricating the first coil conductor;

stripping the first pattern coil;

fabricating the second coil conductor; and planarizing the first plurality of insulating barriers, the first coil conductor and the second coil conductor.

17. The method of claim 12 wherein the step of fabricating a second plurality of insulating barriers further comprises:

fabricating a second seed layer on the middle insulating layer;

fabricating a second pattern coil on the second seed layer, the second pattern coil leaving an exposed second seed layer not covered by the second pattern coil;

enhancing a thickness of the exposed second seed layer;

isotropically eroding the second pattern coil;

removing the enhanced thickness of the exposed second seed layer;

fabricating a mask deposition;

removing a portion of the mask deposition positioned above the second pattern coil and the exposed second seed layer; and stripping the second pattern coil, thereby exposing the second plurality of insulating barriers.

18. The method of claim 17 wherein the step of fabricating a third coil conductor and a fourth coil conductor between the second plurality of insulating barriers further comprises:

fabricating the third coil conductor;

fabricating the fourth coil conductor; and planarizing the second plurality of insulating barriers, the third coil conductor and the fourth coil conductor.

19. The method of claim 12 wherein the step of fabricating a second plurality of insulating barriers further comprises:

fabricating a second seed layer on the middle insulating layer;

fabricating a second pattern coil on the second seed layer, the second pattern coil leaving an exposed second seed layer not covered by the second pattern coil;

enhancing a thickness of the exposed second seed layer;

isotropically eroding the second pattern coil;

removing the enhanced thickness of the exposed second seed layer;

fabricating a mask deposition; and removing a portion of the mask deposition positioned above the second pattern coil and the exposed second seed layer.

20. The method of claim 19 wherein the step of fabricating a third coil conductor and a fourth coil conductor between the second plurality of insulating barriers further comprises:

fabricating the third coil conductor;

stripping the second pattern coil;

fabricating the fourth coil conductor; and planarizing the second plurality of insulating barriers, the third coil conductor and the fourth coil conductor.

* * * * *